US012607293B2

(12) United States Patent
Zhang et al.

(10) Patent No.: US 12,607,293 B2
(45) Date of Patent: Apr. 21, 2026

(54) ROTATING DEVICE

(71) Applicant: Heng Yi Technology Company Limited, Zhaoqing (CN)

(72) Inventors: Mingyue Zhang, Beijing (CN); Xiaobing Wang, Zhaoqing (CN); Liangqing Li, Zhaoqing (CN)

(73) Assignee: Heng Yi Technology Company Limited, Zhaoqing (CN)

( * ) Notice: Subject to any disclaimer, the term of this patent is extended or adjusted under 35 U.S.C. 154(b) by 34 days.

(21) Appl. No.: 18/914,042

(22) Filed: Oct. 11, 2024

(65) Prior Publication Data

US 2025/0035256 A1     Jan. 30, 2025

Related U.S. Application Data

(63) Continuation of application No. PCT/CN2023/084903, filed on Mar. 29, 2023.

(30) Foreign Application Priority Data

Apr. 12, 2022   (CN) .......................... 202210382486.4
Oct. 17, 2022   (CN) .......................... 202222728368.2

(51) Int. Cl.
*F16M 11/14*          (2006.01)
*F16M 11/04*          (2006.01)
(Continued)

(52) U.S. Cl.
CPC ........... *F16M 11/14* (2013.01); *F16M 11/041* (2013.01); *F16M 11/18* (2013.01); *G09F 19/02* (2013.01)

(58) Field of Classification Search
CPC .......... G09F 19/00; G09F 19/02; G09F 19/08; F16M 11/14; F16M 11/18
(Continued)

(56) References Cited

U.S. PATENT DOCUMENTS 4,757,986 A * 7/1988 Hwang .................. A63H 33/00
                                                          472/6
4,852,283 A * 8/1989 Teng ....................... G09F 19/08
                                                          40/433
(Continued)

FOREIGN PATENT DOCUMENTS

CN          204005702 U    12/2014
CN          207541839 U     6/2018
WO       2008145009 A1    12/2008

*Primary Examiner* — Todd M Epps
(74) *Attorney, Agent, or Firm* — Westbridge IP LLC

(57) ABSTRACT

A rotating device includes a seat at least part of which includes magnetic attraction coupling means and a rotating body which includes a housing having a central axis of rotation and magnetic attraction coupling means arranged in, and relatively rotatable about the central axis of rotation to, the housing. When the rotating body is placed on the seat, the magnetic attraction coupling means in the housing and the magnetic attraction coupling means of the at least part of the seat attract each other by magnetic force so that the magnetic attraction coupling means in the housing of the rotating body is stationary with respect to the at least part of the seat. The housing of the rotating body and the magnetic attraction coupling means therein are relatively rotatable to each other through a motor.

14 Claims, 4 Drawing Sheets

(51) Int. Cl.
   *F16M 11/18*      (2006.01)
   *G09F 19/02*      (2006.01)

(58) Field of Classification Search
   USPC .................. 248/346.06; 40/406, 410, 414
   See application file for complete search history.

(56)            References Cited

U.S. PATENT DOCUMENTS

| | | | | |
|---|---|---|---|---|
| 4,961,276 | A * | 10/1990 | Lin | A63H 13/00 |
| | | | | 428/3 |
| 6,508,022 | B2 * | 1/2003 | Huang | G09F 19/08 |
| | | | | 40/406 |
| 6,523,287 | B1 * | 2/2003 | Lee | G09F 19/02 |
| | | | | 40/406 |
| 6,588,130 | B1 * | 7/2003 | Yang | G09F 19/02 |
| | | | | 40/406 |
| 6,722,064 | B2 * | 4/2004 | Knapp | G09F 19/02 |
| | | | | 40/410 |
| 8,960,937 | B2 * | 2/2015 | Yang | F21V 21/00 |
| | | | | 40/406 |
| 9,022,593 | B2 * | 5/2015 | Yang | G09F 19/02 |
| | | | | 362/101 |
| 10,825,366 | B1 * | 11/2020 | Yang | G09F 19/02 |
| 11,738,282 | B2 * | 8/2023 | Yang | A63H 33/26 |
| | | | | 472/67 |

* cited by examiner

ROTATING DEVICE

CROSS-REFERENCE TO RELATED APPLICATIONS

This application is a continuation of International Application No. PCT/CN2023/084903, filed on Mar. 29, 2023, which claims priorities to Chinese Patent Application No. 202210382486.4, filed on Apr. 12, 2022, and Chinese Patent Application No. 202222728368.2, filed on Oct. 17, 2022. All of the aforementioned applications are incorporated herein by reference in their entireties.

TECHNICAL FIELD

The present application relates to a rotating device in general.

BACKGROUND

International Patent Application Publication WO2008145009A1 discloses a self-rotating picture frame in which a motor and a transmission are arranged, the rotating part of the motor is fixedly mounted to the body of the picture frame, and the relatively stationary part of the motor extends out of the body of the picture frame in the form of a supporting foot. When the foot is placed on a suitable supporting surface, the foot is fixed thereon with the help of the frame's own gravity, so that the frame can self-rotate around the foot.

Although this self-rotating picture frame can also bring a sense of novelty, due to the foot extending from the motor and thus being exposed, it on one hand destroys the integrity or tightness of the device itself, and on the other hand weakens the novelty of self-rotating to some extent.

SUMMARY

The object of the present application is to provide a novel rotating structure.

According to the present application, there is provided a rotating device which comprises a seat and a rotating body, wherein at least part of the seat comprises magnetic attraction coupling means, and the rotating body comprises:

a housing having a central axis of rotation; and magnetic attraction coupling means arranged in, and relatively rotatable about the central axis of rotation to, the housing, wherein the relative rotation is realized by aid of a motor having a shell and a rotation shaft, when the rotating body is placed on the seat, the magnetic attraction coupling means in the housing and the magnetic attraction coupling means of the at least part of the seat attract each other through magnetic force so that the magnetic attraction coupling means in the housing of the rotating body is stationary with respect to the at least part of the seat.

In the present application, the term "magnetic attraction coupling means" refers to such a member(s) that is capable of attracting another by magnetic action. In other words, one of the magnetic attraction coupling means in the housing of the rotating body and the magnetic attraction coupling means of the seat can be a magnet, and the other can be a magnet or ferromagnetic material such as iron, cobalt, nickel, etc. Magnets can be permanent magnets or electromagnets.

According to the rotating device of the present application, the housing of the rotating body can be fixedly mounted to the rotation shaft of the motor, and the magnetic attraction coupling means in the housing can be fixedly mounted to the shell of the motor. Alternatively, the housing of the rotating body can be fixedly mounted to the shell of the motor, and the magnetic attraction coupling means in the housing can be fixedly mounted to the rotation shaft of the motor.

According to the rotating device of the present application, there may also be an electric device arranged in the housing, such as an illuminating or sound-emitting device, etc. In this case, there may also be a wired or wireless power supply in the housing for supplying power to the electric device or to the motor in the housing.

According to the rotating device of the present application, the housing may be basically closed or open. In addition, the housing can be transparent or translucent or opaque.

According to the rotating body of the present application, a self-rotating effect of the rotating body on the magnetic seat can be realized without any independent supporting foot extending out of the housing as a fixed pivot. For example, when the rotating body is used as a spherical lamp with a built-in motor, neither the shell nor the rotation shaft of the motor needs to be extended out of the housing of the spherical lamp, which ensures the appearance integrity and complete sealing of the housing of the spherical lamp, and at the same time can realize its peculiar self-rotation effect on the seat.

According to the rotating device of the present application, the seat may also comprise an additional part, and when the rotating body is placed on the seat, the at least one part and the additional part of the seat are relatively rotatable to each other about the central axis of rotation of the housing. This structure can reduce the friction of the rotating body as it rotates on the seat and thus reduce any resulting noise.

According to the rotating device of the present application, the at least one part and the additional part of the seat can be relatively rotatable to each other through a bearing. In this case, the at least one part of the seat can be fixedly mounted to an outer side of the bearing, and the additional part to an inner side of the bearing, or vice versa.

For such a seat structure with a bearing, it can be produced, for example, in the form of a fidget spinner. When the rotating body with built-in motor is placed, for example, on a pivot provided on the inner side of the fidget spinner, hand-holding the outer part of the fidget spinner can realize the self-rotation of the rotating body, while hand-holding the inner side pivot of the fidget spinner can realize the self-rotation of the outer part of the fidget spinner.

According to the rotating device of the present application, the magnetic attraction coupling means in the housing may include at least one magnet, and the at least part of the seat may also include at least one magnet correspondingly. When the rotating body is placed on the seat, the at least one magnet of the magnetic attraction coupling means in the housing aligns with the at least one magnet of the at least part of the seat by aid of magnetic attraction.

According to the rotating device of the present application, the seat and the rotating body can be each provided with rapid positioning matching mechanism, so as to ensure a rapid and accurate positioning of the rotating body on the seat.

According to the rotating device of the present application, the seat may also be designed as a calendar base, with at least one indicator runner located on the outer surface and an indicator bead that can be operationally movably positioned in the at least one indicator runner. The at least one indicator runner may comprise two annular indicator runners radially spaced from each other, one of which is formed with date identification, the other with week or month identification, and each indicator runner corresponds to an indicator bead. In addition, the rotating body can be a spherical moon phase lamp one half of which can be lit up and the other half can remain relatively dim.

Upon engagement of the rotating body with the magnetic seat, the rotating device of the present application can realize self-rotation of the house of the rotating body on the seat while keeping portions set in the house relatively stationary, or vice versa. This is undoubtedly refreshing for users.

DETAILED DESCRIPTION OF THE EMBODIMENTS

The present application is further explained below in conjunction with the embodiments and drawings, and those skilled in the art should understand that the embodiments and drawings are only for a better understanding of the present application, and not for any limitation.

Figure 1:
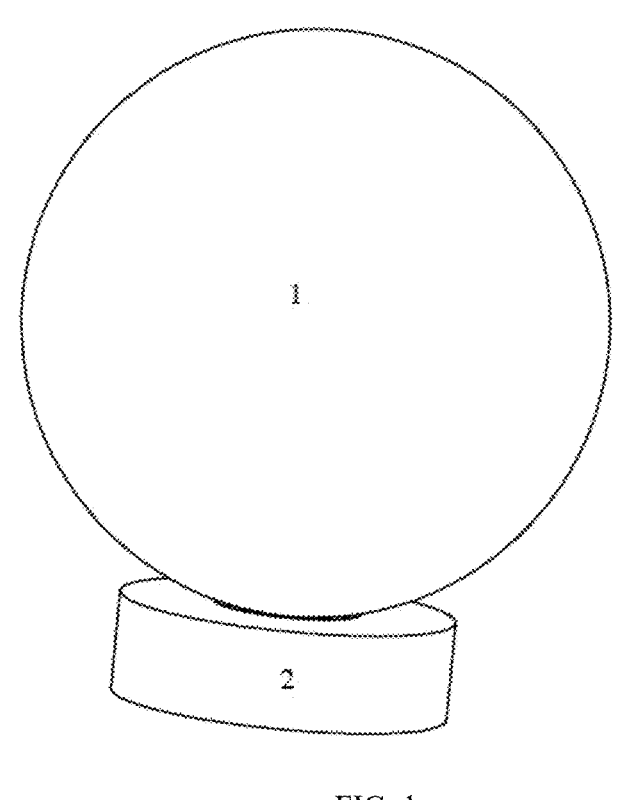
FIG. 1 schematically illustrates an overall shape of a rotating device according to a first embodiment of the present application.

As shown in FIG. 1, a rotating device of the present application comprises a rotating body 1 and a seat 2, and the rotating body 1 is used with the seat 2. The rotating body 1 may be any suitable electrical appliance such as a spherical lamp, in which a light-emitting component, a sound-generating component and a corresponding wired or wireless power supply (not specifically shown) may be arranged.

Figure 2:
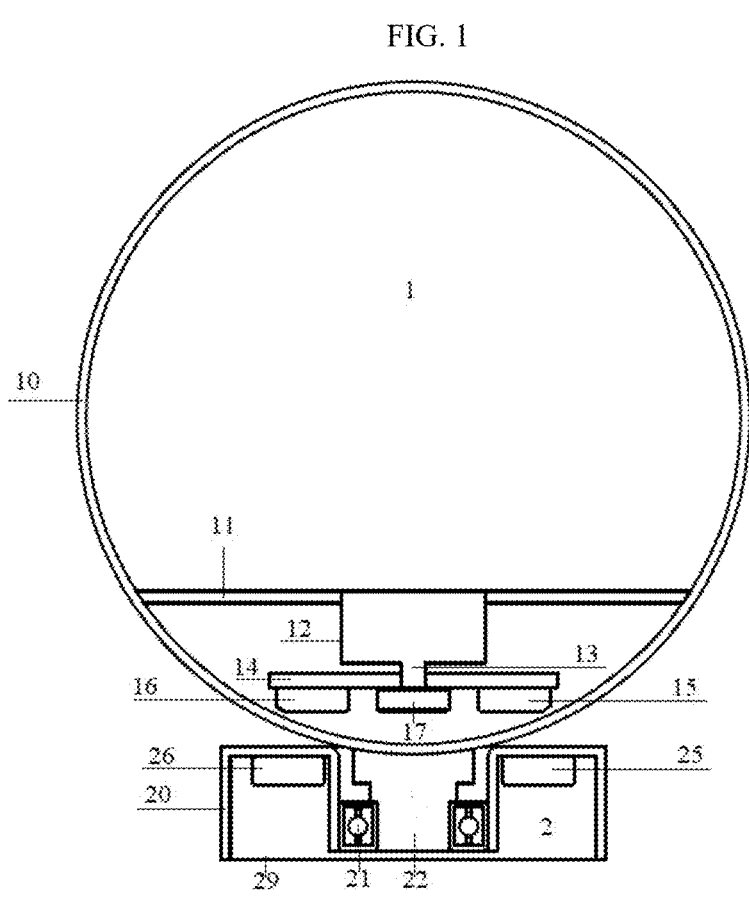
FIG. 2 schematically illustrates the rotating device shown in FIG. 1 in a cross-sectional view.
Figure 3:
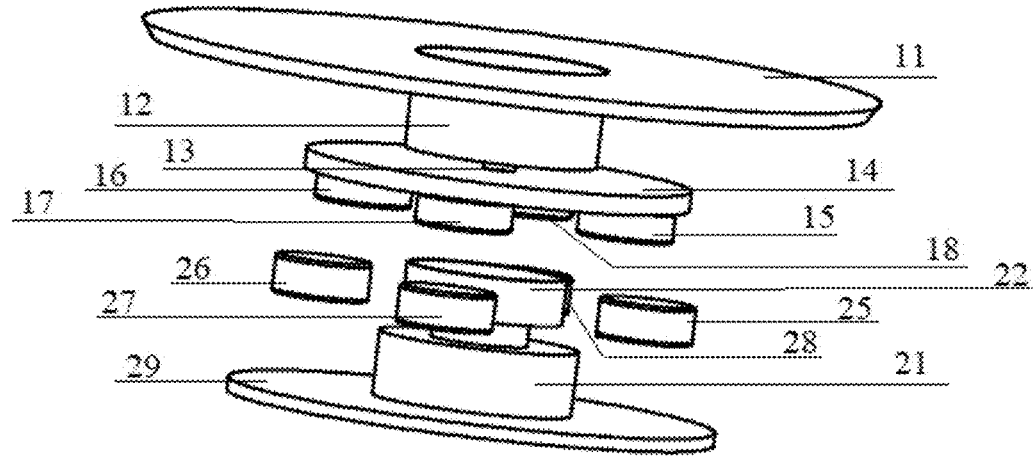
FIG. 3 schematically illustrates the rotating device shown in FIG. 1 in a perspective view, with the house of the rotating body and the upper cover of the seat being removed.

As shown in detail in FIG. 2 and FIG. 3, the rotating body 1 has a spherical housing 10, in which a horizontal rack 11 is fixed. A shell 12 of the motor is fixed on the rack 11, while a rotation shaft 13 extends vertically downward out of the shell 12. A fixing frame 14 is fixedly connected with the rotation shaft 13, on which a plurality of permanent magnets 15, 16, 17, 18 are uniformly fixed around the rotation shaft 13 circumferentially. The rotation shaft 13 and its permanent magnets 15, 16, 17 and 18 are positioned within the housing 10 and are not in contact with the inner wall of the housing 10.

The seat 2 has a cylindrical outer contour formed by combination of an upper cover 20 and a bottom plate 29. The seat 2 is also provided with a bearing 21, a rotating pillar 22 and permanent magnets 25, 26, 27, and 28. The outer side of the bearing 21 is fixed on the base plate 29, and the inner side of the bearing 21 is fixed on the pillar 22. The permanent magnets 25, 26, 27 and 28 are uniformly fixed at the top of the upper cover 20 circumferentially around the pillar 22, and are respectively aligned with the permanent magnets 15, 16, 17 and 18 in the rotating body 1 by aid of magnetic attraction. The upper surface of the pillar 22 is slightly concave to form a concave surface mated with the spherical house 10 of the rotating body 1. Of course, the upper surface of the pillar 22 and the bottom of the spherical house 10 of the rotating body 1 can also optionally take other positioning forms of matching mechanism, such as a positioning protrusion and a corresponding receiving recess, or magnetic attraction matching structures.

The working principle of the rotating device of the present application is briefly described below. As shown in FIGS. 1-3, the rotating body 1 is first placed on the rotating pillar 22 that is fixed on the inner side of the bearing 21 of the seat 2. At this moment, the permanent magnets 15, 16, 17, 18 fixed on the motor rotation shaft 13 in the rotating body 1 can attract and align with permanent magnets 25, 26, 27, 28 fixed on the outer side of the bearing 21 in the seat 2 respectively, and the motor rotation shaft 13 in the rotating body 1 and part of the seat that is located on the outer side of the bearing 21 are thus fixed with each other but apart in space. Next, the motor is started by, for example, a remote control switch (not shown); or alternatively, when a wireless power supply receiving coil is arranged in the rotating body 1 and a wireless power supply transmitting coil is arranged in the seat 2, the motor is controlled to run by a power switch arranged on the seat 2. Because the motor rotation shaft 13 has been relatively fixed as described above, the motor shell 12 will drive the housing 10 to rotate horizontally around the motor rotation shaft 13 through the rack 11, and the pillar 22 located on the inner side of the bearing 21 will also rotate synchronously around the central axis of rotation of the housing 10 (the extension line of the motor rotation shaft 13) along with the housing 10.

Those skilled in the art can understand that the seat 2 is not limited to being placed horizontally under the rotating body 1, but can also be placed vertically on either side of the rotating body 1, or placed on top of the rotating body 1 to form a chandelier structure, for example. The bearing 21 in the seat 2 can also be omitted, although the frictional force of the rotating body 1 when it rotates on the seat 2 will be increased. In addition, although the housing 10 of the rotating body 1 is illustrated as a closed spherical shell, it can also take a semi-closed or open shell of any other suitable form. In addition, the housing 10 of the rotating body 1 may also be made of transparent, translucent or opaque material to display different visual effects. In addition, although it is not particularly shown, the rotating body 1 may also be provided with a reduction transmission that works with the motor. In addition, the motor of the rotating body 1 can also be simplified to a simple bearing structure (for example, the motor shell 12 is simplified to an outer ring of the bearing and the rotation shaft 13 of the motor to an inner ring of the bearing), and rotation of the rotating body 1 is performed by manually rotating the housing 10 of the rotating body 1 or by manually or electrically rotating the pillar 22 of the seat 2. In addition, the rotating body 1 and the seat 2 are not limited to using a plurality of permanent magnets arranged circumferentially around the central axis of rotation, as long as a mutual magnetic attraction and fixation is realized: for example, ferromagnetic materials such as pure iron and permanent magnets can also be used to attract each other; and for another example, the housing 10 of the rotating body 1 can also be placed on the outer part of the bearing 21 of the seat 2, and corresponding magnetic attraction coupling means can be fixed on the inner part of the bearing 21 or along the central axis of rotation.

Figure 4:
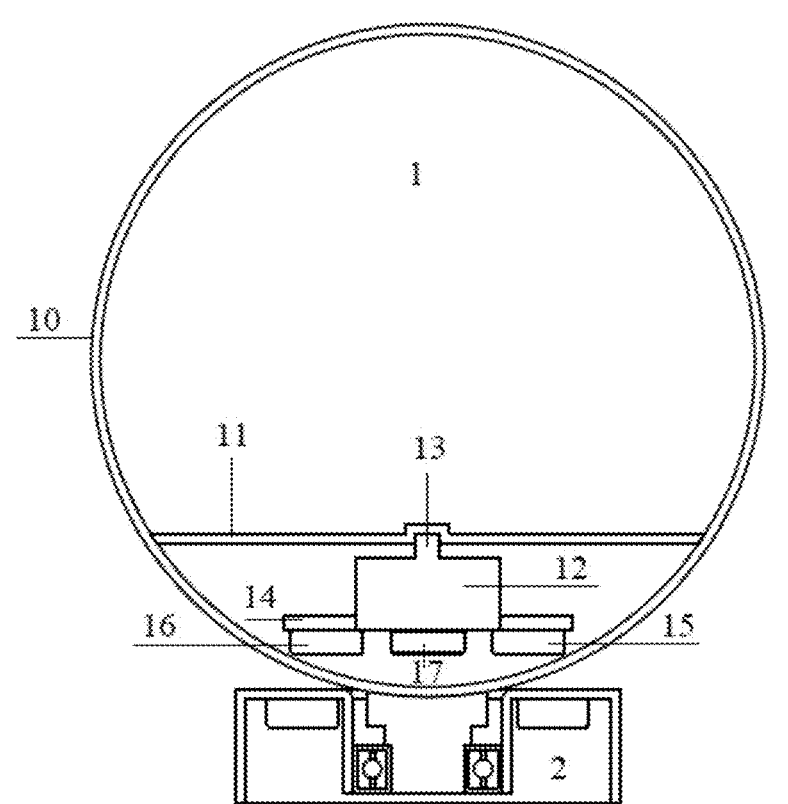
FIG. 4 schematically illustrates a rotating device in a cross-sectional view according to a second embodiment of the present application.

FIG. 4 shows a variant of the rotating device of the embodiment shown in FIGS. 1-3 in a cross-section. Compared with the embodiment shown in FIG. 2, the variant of FIG. 4 keeps the structure of the seat 2 unchanged, but only changes the arrangement of the motor in the rotating body 1, that is, the motor rotation shaft 13 is fixed on the rack 11, and the permanent magnets 15, 16 and 17 are fixed on the motor shell 12. This structure can likewise realize the automatic rotation of the rotating body 1 on the seat 2.

Figure 5:
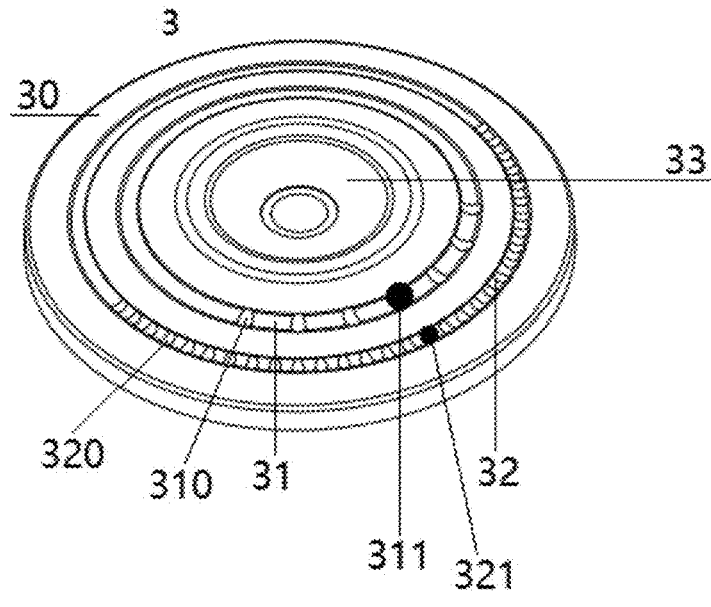
FIG. 5 is a perspective view of a calendar base according to the present application.

FIG. 5 shows a seat 3 constructed in the form of a calendar base. The disc-shaped seat 3 as shown has a casing 30 which forms a central circular receiving recess 33, and a first indicator runner 31 and a second indicator runner 32 in the form of two concentric annular grooves are arranged radially apart from each other around the receiving recess 33 on an upper surface of the casing 30. A first indicator bead 311 is operationally movably positioned at one of a plurality of setting positions 310 in the first indicator runner 311, and a second indicator bead 321 is also operationally movably positioned at one of a plurality of setting positions 320 in the second indicator runner 32. The first indicator bead 311 and the second indicator bead 321 can form a magnetic fit relationship with the first indicator runner 31 and the second indicator runner 32 respectively, so that the indicator bead can be quickly and conveniently positioned at the desired setting position of the indicator runner upon being moved or pushed along the indicator runner.

In the calendar base shown in FIG. 5, the height of the disc body of the seat 3 is shown gradually decreased radially outward, except where the receiving recess and the annular grooves are provided. In addition, the indicator runner 31 can also be provided with corresponding week or month markers at setting positions, and the indicator runner 32 with corresponding date markers at setting positions.

Figure 6:
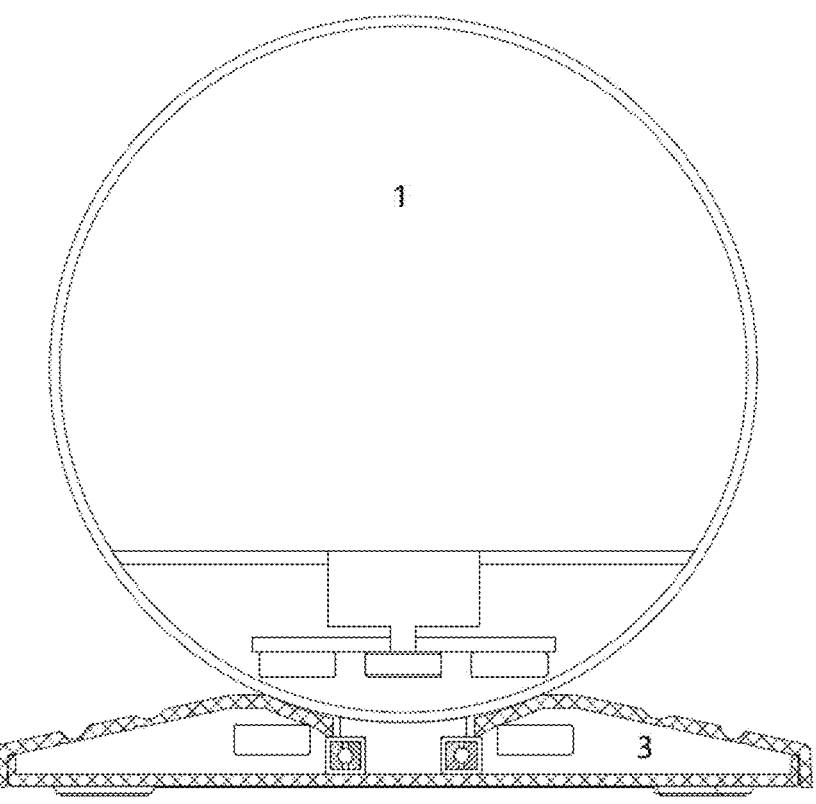
FIG. 6 schematically illustrates a rotating device with a calendar base in a cross-sectional view according to the present application.

The embodiment shown in FIG. 6 is similar to that shown in FIG. 2, except with a seat 3 as shown in FIG. 5.

Figure 7:
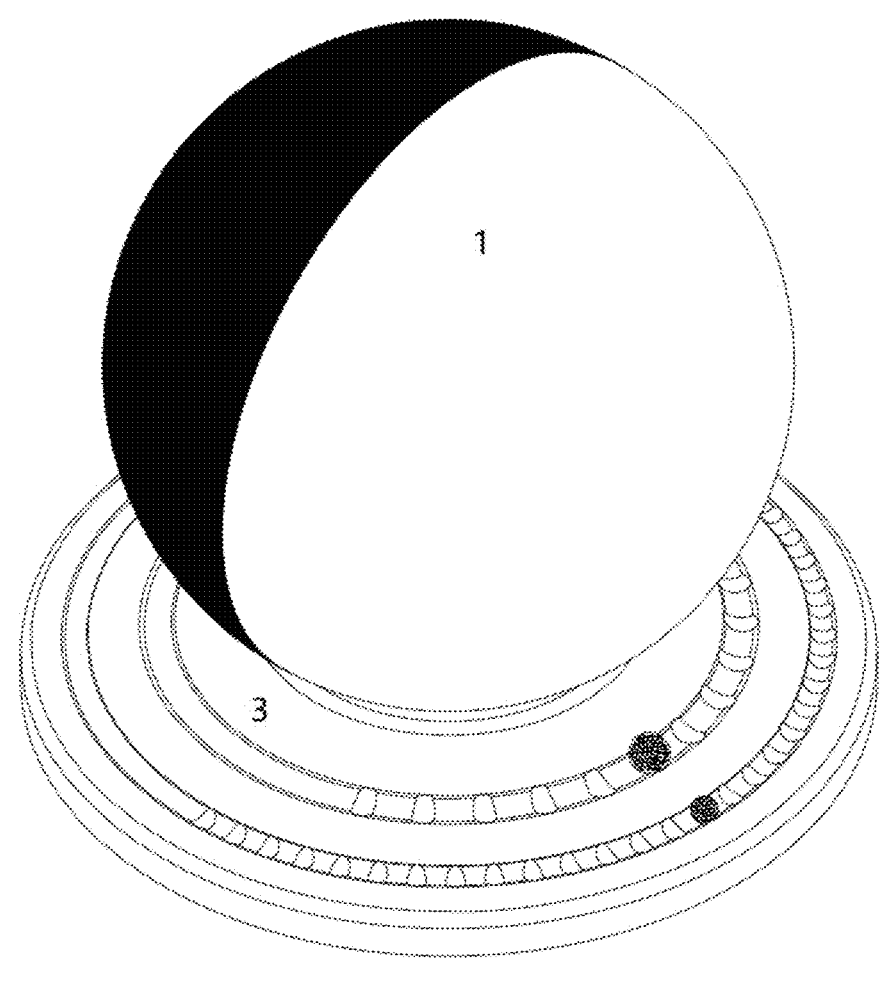
FIG. 7 schematically illustrates a rotating device with a spherical moon phase lamp and a calendar base according to another embodiment of the present application.

FIG. 7 is a perspective view of the rotating body 1 which takes the form of a spherical moon phase lamp and is placed in an adjustable manner in the receiving recess 33 of the seat 3 shown in FIG. 5. Such a spherical moon phase lamp is capable of creating areas of inconsistent brightness on its spherical outer surface, such as a half dark area and a half lit-up area as illustrated. This spherical moon phase lamp can have a spherical shell that is half transparent and half opaque or translucent, and a light source located inside the spherical housing.

Alternatively, the spherical moon phase lamp can have a spherical shell formed by 3D printing and a light source, and the internal of the spherical moon phase lamp is divided into two parts by a light barrier plate, with the light source being located in one of the two parts. Further, the two internal parts of the spherical moon phase lamp, separated by a light barrier plate, can each have an independently controlled light source so as to achieve a semi-brightness or full-brightness state as needed.

Those skilled in the art should understand that the above-mentioned directional terms "horizontal", "vertical", etc., are only with respect to the drawings and not intended to limit the present application.

What is claimed is:

1. A rotating device comprising a seat and a rotating body, wherein at least part of the seat comprises magnetic attraction coupling means, and the rotating body comprises:

a housing having a central axis of rotation; and magnetic attraction coupling means arranged in, and relatively rotatable about the central axis of rotation to, the housing, wherein a relative rotation is realized by aid of a motor having a shell and a rotation shaft, when the rotating body is placed on the seat, the magnetic attraction coupling means in the housing and the magnetic attraction coupling means of the at least part of the seat attract each other through magnetic force so that the magnetic attraction coupling means in the housing of the rotating body is stationary with respect to the at least part of the seat.

2. The rotating device of claim 1, wherein the housing of the rotating body is fixedly mounted to the rotation shaft of the motor, and the magnetic attraction coupling means in the housing is fixedly mounted to the shell of the motor.

3. The rotating device of claim 1, wherein the housing of the rotating body is fixedly mounted to the shell of the motor, and the magnetic attraction coupling means in the housing is fixedly mounted to the rotation shaft of the motor.

4. The rotating device of claim 1, further comprising an electric device arranged in the housing.

5. The rotating device of claim 4, further comprising a wired or wireless power supply arranged in the housing for supplying power to the electric device in the housing.

6. The rotating device of claim 1, wherein the housing is basically closed or open.

7. The rotating device of claim 1, wherein the housing is transparent or opaque.

8. The rotating device of claim 1, wherein the seat comprises an additional part, and when the rotating body is placed on the seat, the at least part and the additional part of the seat are relatively rotatable to each other about the central axis of rotation of the housing of the rotating body.

9. The rotating device of claim 8, wherein the at least part and the additional part of the seat are relatively rotatable to each other through a bearing.

10. The rotating device of claim 9, wherein the at least part of the seat is fixedly mounted to an outer side of the bearing, and the additional part to an inner side of the bearing.

11. The rotating device of claim 9, wherein the at least part of the seat is fixedly mounted to an inner side of the bearing, and the additional part to an outer side of the bearing.

12. The rotating device of claim 1, wherein the magnetic attraction coupling means in the housing comprises at least one magnet, and the at least part of the seat also comprises at least one magnet correspondingly, when the rotating body is placed on the seat, the at least one magnet of the magnetic attraction coupling means in the housing aligns with the at least one magnet of the at least part of the seat by aid of magnetic attraction.

13. The rotating device of claim 1, wherein the seat and the rotating body are each provided with rapid positioning matching mechanism, so as to ensure a rapid and accurate positioning of the rotating body on the seat.

14. The rotating device of claim 1, wherein the seat is provided with at least one indicator runner and an indicator bead that is operationally movably positioned in the at least one indicator runner.

* * * * *